(12) United States Patent
Tang et al.

(10) Patent No.: US 8,905,370 B2
(45) Date of Patent: Dec. 9, 2014

(54) SUPPORTING DEVICE FOR DISPLAY APPARATUS

(71) Applicant: Shenzhen China Star Optoelectronics Technology Co., Ltd., Shenzhen (CN)

(72) Inventors: Guofu Tang, Shenzhen (CN); Yuchun Hsiao, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 42 days.

(21) Appl. No.: 13/704,984

(22) PCT Filed: Dec. 3, 2012

(86) PCT No.: PCT/CN2012/085759
§ 371 (c)(1),
(2), (4) Date: Dec. 17, 2012

(87) PCT Pub. No.: WO2014/082314
PCT Pub. Date: Jun. 5, 2014

(65) Prior Publication Data
US 2014/0144855 A1  May 29, 2014

(30) Foreign Application Priority Data

Nov. 29, 2012  (CN) .......................... 2012 1 0499349

(51) Int. Cl.
*F16M 13/00* (2006.01)
*F16M 11/22* (2006.01)
*F16M 11/42* (2006.01)

(52) U.S. Cl.
CPC ............... *F16M 11/22* (2013.01); *F16M 13/00* (2013.01); *F16M 11/42* (2013.01)

USPC .......................................................... 248/676

(58) Field of Classification Search
USPC ........ 211/85.8, 20, 23, 24, 189, 195, 26, 191, 211/192, 183, 13.1; 248/127, 128, 129, 248/558, 676, 637, 671, 672, 680, 121; 280/79.11, 79.3
See application file for complete search history.

(56) References Cited

U.S. PATENT DOCUMENTS

| 811,657 | A | * | 2/1906 | O'Brien ........................ 211/27 |
| 2,738,539 | A | * | 3/1956 | Schultz, Jr. ...................... 16/29 |
| 4,572,593 | A | * | 2/1986 | Takamizawa et al. ........ 312/114 |
| 5,255,803 | A | * | 10/1993 | Pavone et al. ................. 211/189 |
| 5,372,262 | A | * | 12/1994 | Benson et al. ................. 211/26 |
| 5,558,027 | A | * | 9/1996 | Williams et al. ............... 109/45 |
| 5,857,685 | A | * | 1/1999 | Phillips et al. ............. 280/47.35 |
| 5,918,750 | A | * | 7/1999 | Jackson ........................ 211/189 |

(Continued)

*Primary Examiner* — Jennifer E Novosad
(74) *Attorney, Agent, or Firm* — Andrew C. Cheng

(57) ABSTRACT

A supporting device for a display apparatus is disclosed. The supporting device comprises a chassis, threaded stem casters, a bed plate, and a main beam. The plurality of casters disposed in the chassis allow the supporting device be moved. The bed plate covers the chassis and comprises a first top wall and a first side wall surrounding the first top wall. A height of the first side wall is greater than that of the chassis. The first top wall covers and is on top of the chassis. The first top wall comprises an opening area. The plurality of casters are located in the opening area. The main beam is fixed to the chassis for hanging the display apparatus. The present invention supporting device is readily adjustable. The display apparatus is moved conveniently and efficiently, and the integration design of the supporting device and the display apparatus is more aesthetically pleasing.

14 Claims, 10 Drawing Sheets

(56) References Cited

U.S. PATENT DOCUMENTS 5,967,339 A * 10/1999 Utsumi et al. ............. 211/41.12
6,457,595 B1 * 10/2002 Pritchard et al. ............. 211/189
2009/0212479 A1 * 8/2009 Yu .................................. 269/309
2011/0012489 A1 * 1/2011 Shen et al. .................... 312/326
2012/0018397 A1 * 1/2012 Fan ................................ 211/134
2013/0168335 A1 * 7/2013 Gillespie ........................ 211/26

* cited by examiner

SUPPORTING DEVICE FOR DISPLAY APPARATUS

BACKGROUND OF THE INVENTION

1. Field of the Invention

The present invention relates to a display technology, more particularly, to a supporting device for a display apparatus.

2. Description of the Related Art

Nowadays, the supporting devices for display apparatuses are classified into movable and immovable supporting devices.

There is not any movable caster disposed in an immovable supporting device. Under the circumstances, the bottom of the supporting device contacts with the ground, which makes the design aesthetically pleasing. However, the weight of the display apparatus is heavier as the display area of the display apparatus becomes larger. Since the immovable supporting device does not have any movable caster, it is inconvenient to move the display apparatus.

There are a plurality of movable casters disposed in the movable supporting device. The casters are usually fixed to the chassis of the supporting device by welding or screw tightening. At the same time, there are also a plurality of foot cups disposed under the chassis. In this manner, a wrench needs to be utilized to turn down the foot cups until the casters reaching the ground before the display apparatus can be moved to a specified location by moving the casters of the supporting device. After the display apparatus is moved to the specified location, the wrench is utilized to turn up the foot cups so that the casters suspend. Because the foot cups are disposed under the bottommost part of the chassis of the supporting device and contact with the ground, a user needs to lie prostrate to perform a wrenching operation in as limited clearance between the ground and the chassis to turn up or turn down the foot cups. This brings inconvenience to the user. Furthermore, in order to facilitate the wrenching operation, a bigger clearance between the chassis of the supporting device and the ground is required. The bigger the clearance is, the less aesthetically pleasing the integration design of the supporting device and the display apparatus is.

Therefore, it is very important to provide a supporting device for a display apparatus to solve the above-mentioned problem.

SUMMARY OF THE INVENTION

The present invention provides a readily adjustable supporting device for a display apparatus to allow the display apparatus be moved conveniently and efficiently and give the integration design of the supporting device and the display apparatus a more aesthetically pleasing look.

The present invention provides a supporting device of a display apparatus. The display apparatus comprises a chassis, a plurality of threaded stem casters, a bed plate, a first movable face plate, a second movable face plate, and a main beam. The chassis is formed by splicing a first unit and a second unit. The first unit and the second unit are both quadrate pipes. The chassis comprises at least two caster mount brackets. The caster mount brackets are fixed at joints of the first unit and the second unit. The plurality of threaded stem casters are disposed in the chassis and mounted to the caster mount brackets correspondingly so that the supporting device is allowed be moved. The bed plate covers the chassis. The bed plate comprises a first top wall and a first side wall surrounding the first top wall. A height of the first side wall is greater than a height of the chassis. The first top wall covers and is on top of the chassis. The first top wall comprises an opening area. The plurality of casters and the caster mount brackets are located in the opening area. The first movable face plate and the second movable face plate are disposed on top of the opening area. The main beam is fixed to the chassis for hanging the display apparatus. The main beam comprises quadrate pipes. A plurality of positioning structures at different heights are disposed in the main beam.

In one aspect of the present invention, each of the positioning structures in the main beam comprises a mounting hole and two concentric limiting holes. The mounting hole is disposed on a first side of the quadrate pipe for accommodating a locking member. The locking member is used for hanging the display apparatus on the first side of the quadrate pipe. The two concentric limiting holes are respectively disposed on a second side and a third side intersecting with the first side of the quadrate pipe for limiting an upward exercise of the locking member along the height direction of the quadrate pipe.

In another aspect of the present invention, the first unit of the chassis comprises a first splicing piece and a second splicing piece spaced apart from the first splicing piece. The second unit is used for connecting the first splicing piece and the second splicing piece. The second unit comprises a third splicing piece and a fourth splicing piece.

In still another aspect of the present invention, the chassis comprises a first caster mount bracket, a second caster mount bracket, a third caster mourn bracket, and a fourth caster mount bracket. The first caster mount bracket, the second caster mount bracket, the third caster mount bracket, and the fourth caster mount bracket are located, in the opening area of the bed plate. The supporting device comprises four threaded stem casters. The four threaded stem casters are mounted to the first caster mount bracket, the second caster mount bracket, the third caster mount bracket, and the fourth caster mount bracket correspondingly. A clearance between the first caster mount bracket, the second caster mount bracket, the third caster mount bracket, and the fourth caster mount bracket and the ground is greater than a diameter of the four threaded stem casters.

In yet another aspect of the present invention, the supporting device further comprises a support member and a storage box between a first support and a second support. The support member is disposed above the caster mount brackets, and the storage box is disposed on the support member.

The present invention further provides a supporting device for a display apparatus. The supporting device comprises a chassis, a plurality of threaded stem casters, a bed plate, and a main beam. The plurality of casters are disposed in the chassis so that the supporting device is allowed to be moved. The bed plate covers the chassis. The bed plate comprises a first top wall and a first side wall surrounding the first top wall. A height of the first side wall is greater than a height of the chassis. The first top wall covers and is on top of the chassis. The first top wall comprises art opening area. The plurality of casters are located in the opening area. The main beam is fixed to the chassis fir hanging the display apparatus.

In one aspect of the present invention, the main beam comprises quadrate pipes, a plurality of positioning structures at different heights are disposed in the main beam. Each of the positioning structures comprises a mounting hole and two concentric limiting holes. The mounting hole is disposed on a first side of the quadrate pipe for accommodating a locking member. The locking member is used for hanging the display apparatus on the first side of the quadrate pipe. The two concentric limiting holes are respectively disposed on a second side and a third side intersecting with the first side of the quadrate pipe for limiting an upward exercise of the locking member along the height direction of the quadrate pipe.

In another aspect of the present invention, the main beam comprises a first support and a second support parallel with and spaced apart from the first support. The plurality of positioning structures are disposed in the first support and the second support. The positioning structures in the first support are corresponding, to the positioning structures in the second support. The mounting hole comprises a square hole and a concave hole connecting with the square hole, and the limiting holes are disposed at a connecting region between the square hole and the concave hole along a direction of the main beam.

In another aspect of the present invention, the chassis is formed by splicing the first unit and the second unit. The first unit and the second unit are both quadrate pipes. The first unit comprises a first splicing piece and a second splicing piece spaced apart from the first splicing piece. The second unit is used for connecting the first splicing piece and the second splicing piece. The second unit comprises a third splicing piece and a fourth splicing piece. The first support is fixed to the first splicing piece, and the second support is fixed to the second splicing piece.

In another aspect of the present invention, the supporting device further comprises auxiliary supports, a first sleeve, and a second sleeve. The auxiliary supports comprise a first auxiliary support and a second auxiliary support. The first auxiliary support is a quadrate pipe and each of two ends of the first auxiliary support is respectively connected to the first support and the first splicing piece to form a first triangular structure. The second auxiliary support is a quadrate pipe and each of two ends of the second auxiliary support is respectively connected to the second support and the second splicing piece to form a second triangular structure. The first sleeve is slid over the first triangular structure, and the second sleeve is slid over the second triangular structure.

In another aspect of the present invention, the chassis further comprises at least two caster mount brackets. The caster mount brackets are located in the opening area of the bed plate and fixed at joints of the first unit and the second unit. The casters are mounted to the caster mount brackets correspondingly, and a clearance between the caster mount brackets and the ground is greater than a diameter of the casters.

In another aspect of the present invention, the chassis comprises a first caster mount bracket, a second caster mount bracket, a third caster mount bracket, and a fourth caster mount bracket. The first caster mount bracket, the second caster mount bracket, the third caster mount bracket, and the fourth caster mount bracket are located in the opening area of the bed plate. Each of two ends of the first caster mount bracket is respectively fixed to the first splicing piece and the third splicing piece. Each of two ends of the second caster mount bracket is respectively fixed to the second splicing piece and the third splicing piece. Each of two ends of the third caster mount bracket is respectively fixed to the first splicing piece and the fourth splicing piece. Each of two ends of the fourth caster mount bracket is respectively fixed to the second splicing piece and the fourth splicing piece.

In another aspect of the present invention, the supporting device further comprises a first movable face plate and a second movable face plate disposed on the bed plate. The first movable face plate is on top of the first caster mount bracket and the second caster mount bracket, and the second movable face plate is on top of the third caster mount bracket and the fourth caster mount bracket.

In still another aspect of the present invention, the first movable face plate comprises a second top wall and a third side wall, a fourth side wall, and a fifth side wall surrounding the second top wall. The fifth side wall is disposed between the third side wall and the fourth side wall. At least one hook is respectively disposed on the bottom of the third side wall, the fourth side wall, or the fifth side wall. At least one recess corresponding to the hook is disposed on the bed plate. The hook is hooked to the recess correspondingly to fix the first movable face plate to the bed plate. The first sleeve and the second sleeve comprise a first extended wall and a second extended wall extending toward the first movable face plate respectively. The first extended wall and the second extended wall are respectively fixed to the third side wall and the fourth side wall by screw tightening. The second movable face plate is a planar structure and is fixed to the first sleeve and the second sleeve by screw tightening.

In yet another aspect of the present invention, the supporting device further comprises a support member and a storage box between the first support and the second support. The support member is disposed above the caster mount brackets, and the storage box is disposed on the support member.

In contrast to the prior art, in the present invention design the main beam for hanging the display apparatus is fixed on the chassis. In addition, at least two threaded stem casters are diagonally disposed in the chassis, and the chassis is covered by the bed plate. The clearance between the chassis and the ground is thus sheltered by the four walls of the bed plate. The display apparatus is allowed to be moved by wrenching the threaded stem casters in the opening area of the bed plate to turn down them until reaching the ground. After the display apparatus is moved to the specified location, the wrenching operation is performed in the opening area so that the chassis rather than the threaded stem casters contacts with the ground to finish the movement of the display apparatus. The present invention supporting device allows the wrenching operation of the casters to be performed in the opening area. Hence, the wrenching operation is facilitated. Not only can the display apparatus be moved conveniently and efficiently, but also the clearance between the chassis and the ground is sheltered to give the integration design a more aesthetically pleasing look.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The accompanying drawings and embodiments are included to provide a detailed description of the present invention.

Figure 1:
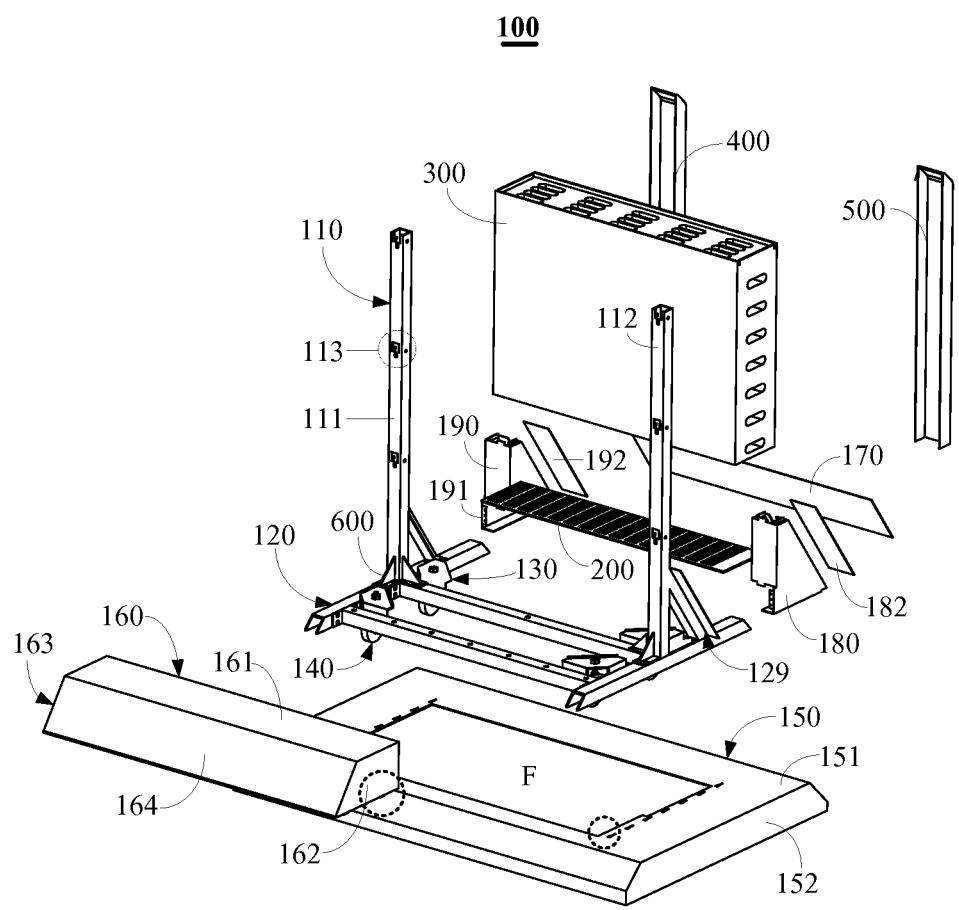
FIG. 1 is an exploded view of a supporting device according to an embodiment of the present invention.

Please refer to FIG. 1. FIG. 1 is an exploded view of a supporting device according to an embodiment of the present invention. As shown in FIG. 1, a supporting device 100 of the present embodiment comprises a main beam 110, a chassis 120, a caster mount bracket 130, a caster 140, a bed plate 150, a first movable face plate 160, a second movable face plate 170, a first sleeve 180, a second sleeve 190, a support member 200, and a storage box 300.

In the present embodiment, the main beam 110 comprises a first support 111 and a second support 112. The first support 111 and the second support 112 are both a quadrate pipe in a long strip. A plurality of positioning structures 113 are disposed in the first support 111 and the second support 112, and the positioning structures 113 in the first support 111 are corresponding to the positioning structures 113 in the second support 112. Each pair of the positioning structures 113 in the first support 111 and the second support 112 has a different height from other pairs of the positioning structures 113 in the first support 111 and the second support 112 so as to hang the display apparatus at different heights.

Figure 2:
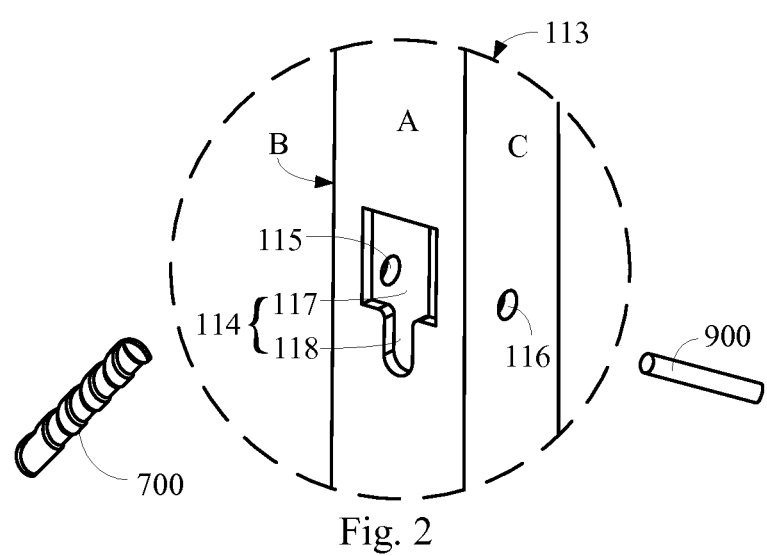
FIG. 2 is a schematic diagram showing a structure of the positioning structure of FIG. 1.

Please refer to FIG. 2, FIG. 2 is a schematic diagram showing a structure of the positioning structure 113 according to the present invention. As shown in FIG. 2, each of the positioning structures 113 comprises a mounting hole 114, a first limiting hole 115, and a second limiting hole 116. The mounting hole 114, disposed on a first side A of the quadrate pipe, comprises a square hole 117 and a concave hole 118 connecting with the square hole 117. The square hole 117 is used for inserting to locking member 700 of a display apparatus to be hung, and the concave hole 118 is used far accommodating the locking member 700 after the display apparatus is hung at a specified position. The square hole 117 cooperates with the concave hole 118 so as to hang the display apparatus on the first side A of the quadrate pipe.

The first limiting hole 115 and the second limiting hole 116 are disposed on a second side B and a third side C of the quadrate pipe respectively. The first limitation hole 115 and the second limiting hole 116 are concentric holes. Moreover, the first limiting hole 115 and the second limiting hole 116 are disposed at a connecting region between the square hole 117 and the concave hole 118 along a direction of the main beam 110. The first limiting hole 115 and the second limiting hole 116 are used for inserting a blocking member 900 so that the upward exercise or the locking member 700 along the height direction of the quadrate pipe is limited.

Figure 3:
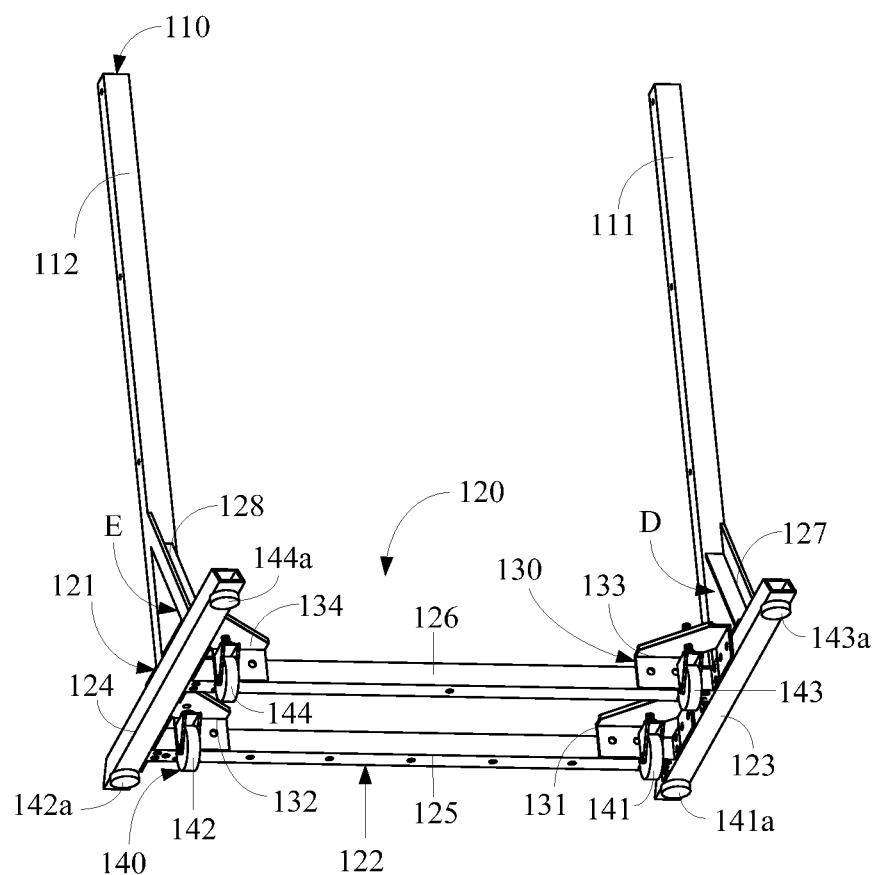
FIG. 3 is a schematic diagram of the cooperation of the chassis and the main beam shown in FIG. 1.

FIG. 3 is a schematic diagram of the cooperation of the chassis 120 and the main beam 110. Please refer to FIG. 1 and FIG. 3, in the present embodiment the chassis 120 is formed by splicing a first unit 121 and a second unit 122. The first unit 212 and the second unit 122 are both quadrate pipes. The first unit 121 comprises a first splicing piece 123 and a second splicing piece 124 spaced apart from the first splicing piece 123. The second unit 122 comprises a third splicing piece 125 and a fourth splicing piece 126. Each of two ends of the third splicing piece 125 is respectively and perpendicularly connected to the first splicing piece 123 and the second splicing piece 124. Each of two ends of the fourth splicing piece 126 is respectively and perpendicularly connected to the first splicing piece 123 and the second splicing piece 124.

In addition, the first support 111 is fixed at a joint between the first splicing piece 123 and the fourth splicing piece 126. The second support 112 is fixed at a joint between the second splicing piece 124 and the fourth piece 126. In order to improve the stability of the connection auxiliary supports 129 are disposed according to the present embodiment. The auxiliary supports 129 comprise a first auxiliary support 127 and a second auxiliary support 128. Each of two ends of the first auxiliary support 127 is respectively connected to the first support 111 and the first splicing piece 123 to form a first triangular structure D. Each of two ends of the second auxiliary support 128 is respectively connected to the second support 112 and the second splicing piece 124 to form a second triangular structure E.

To further improve the stability of the connection, please refer to FIG. 1, in the present embodiment a plurality of triangular supports 600 are disposed at joints of the main beam 110 and the chassis 120.

Please refer to FIG. 1 and FIG. 3 again, the caster mount bracket 130 comprises a first caster mount bracket 131, a second caster mount bracket 132, a third caster mount bracket 133, and a fourth caster mount bracket 134 according to the present embodiment. The first caster mount bracket 131 is fixed at a joint of the first splicing piece 123 and the third splicing piece 125. The second caster mount bracket 132 is fixed at a joint of the second splicing piece 124 and the third splicing piece 125. The third caster mount bracket 133 is fixed at a joint of the first splicing piece 123 and the fourth splicing piece 126. The fourth caster mount bracket 134 is fixed at a joint of the second splicing piece 124 and the fourth splicing piece 126.

According to the present embodiment, the caster 140 comprises a first caster 141, a second caster 142, a third caster 143, and a fourth caster 144. The first caster 141 is mounted to the first caster mount bracket 131 correspondingly. The second caster 142 is mounted to the second caster mount bracket 132 correspondingly. The third caster 143 is mounted to the third caster mount bracket 133 correspondingly. The fourth caster 144 is mounted to the fourth caster mount bracket 134 correspondingly.

A first foot cup 141a, a second foot cup 142a, a third foot cup 143a, and a fourth foot cup 144a are disposed according to the present embodiment. The first foot cup 141a and the third foot cup 143a are respectively disposed at both ends of the first splicing piece 123. The second foot cup 142a and the fourth foot cup 144a are respectively disposed at both ends of the second splicing piece 124.

It should be understood that in other embodiments of the present invention, there may be only two diagonally disposed caster mount brackets. Each of the two caster mount brackets is respectively fixed at the joint of the first splicing piece 123 and the third splicing piece 125 and the joint of the second splicing piece 124 and the fourth splicing piece 126. Or, each of the two caster mount brackets is respectively fixed at the joint of the second splicing piece 124 and the third splicing piece 125 and the joint of the first splicing piece 123 and the fourth splicing, piece 126. Under the circumstances, only two casters are disposed correspondingly.

Figure 4:
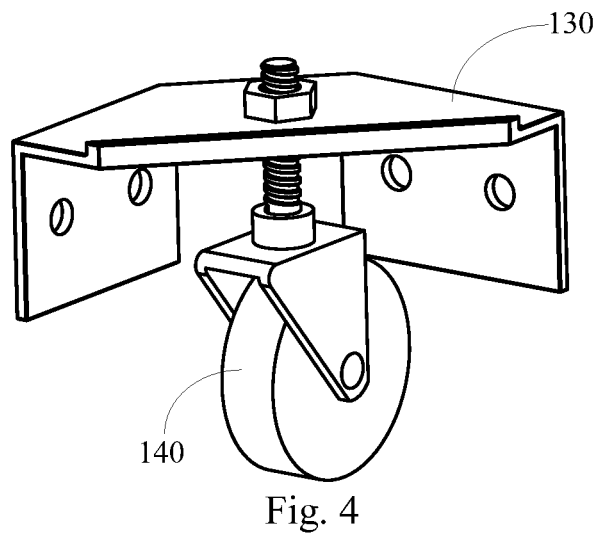
FIG. 4 is a schematic diagram of the cooperation of the casters and the caster mount brackets shown in FIG. 1.

It is worth noting that the clearance between the caster mount brackets and the ground must be greater than a diameter of the caster according to all embodiments of the present invention. The caster is a threaded stem caster (as shown in FIG. 4).

Please refer to FIG. 1 again, the bed plate 150 comprises a first top wall 151 and four first side walls 152 surrounding the first top wall 151. A height of the four first side walls 152 is greater than a height of the chassis 120.

Figure 5:
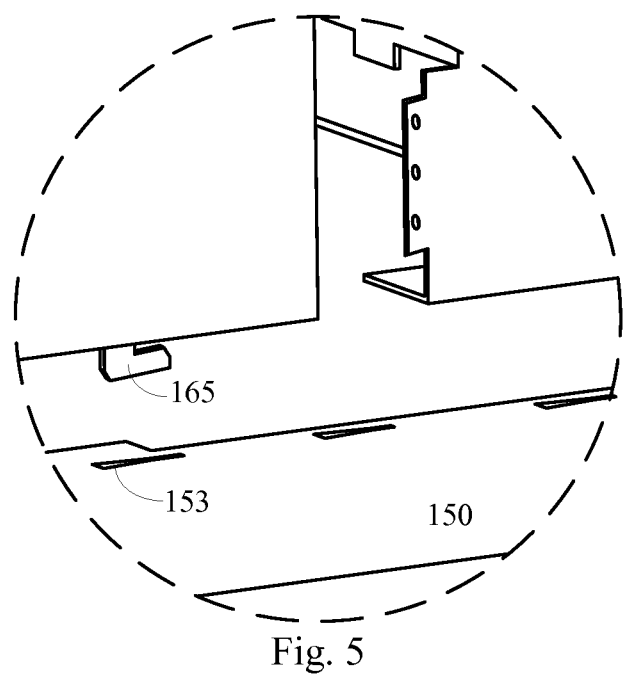
FIG. 5 is a partial schematic diagram of the first movable face plate and the bed plate according to the present invention.
Figure 6:
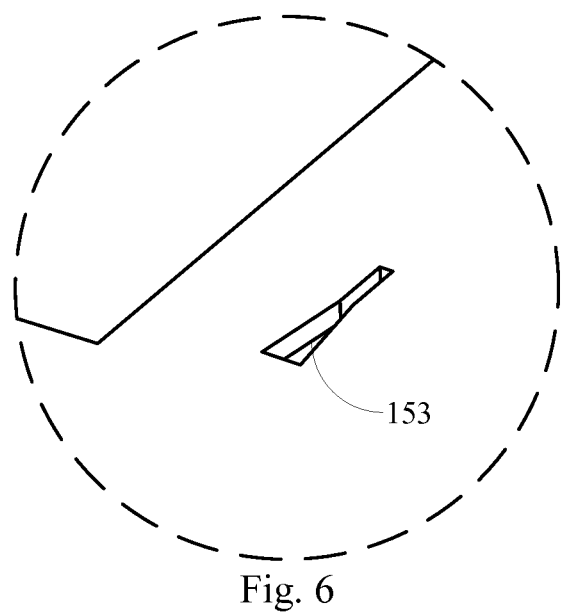
FIG. 6 is a schematic diagram showing a structure of the recess of FIG. 5.

The second movable face plate 170 is a planar structure. The first movable face plate 160 comprises a second top wall 161 and a third site wall 162, a fourth side wall 163, and a fifth side wall 164 surrounding the second top wall 161. The fifth side wall 164 is disposed between the third side wall 162 and the fourth side wall 163. Please refer to FIG. 5 and FIG. 6, at least one hook 165 is respectively disposed on the bottom of the third side wall 162 and the fourth side wall 163. At least one recess 153 corresponding to the book 165 is disposed on portions of the bed plate 150 corresponding to the third wall 162 and the fourth side wall 163. In other embodiments of the present invention, at least one hook 165 is disposed on the bottom of the fifth side wall 164, and at least one corresponding recess 153 is disposed on the bed plate 150.

Figure 7:
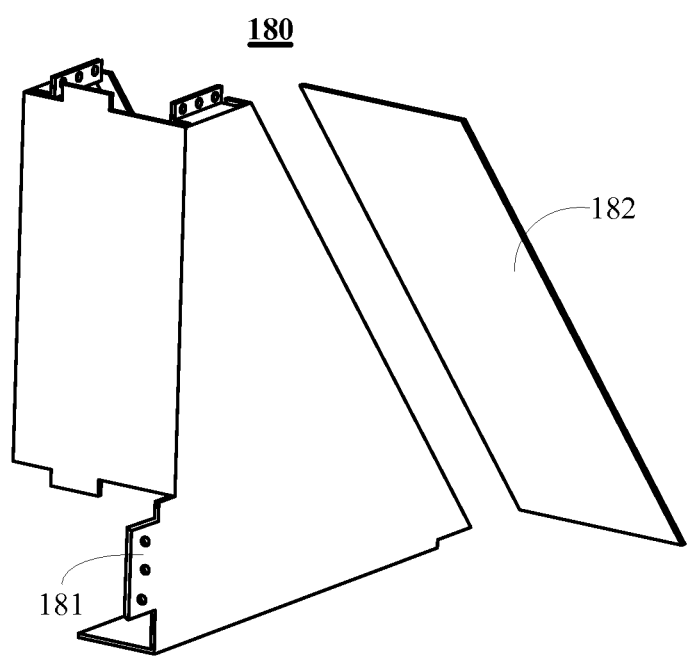
FIG. 7 is a schematic diagram showing a structure of the first sleeve of FIG. 1.

FIG. 7 is a schematic diagram showing a structure of the first sleeve 180 of FIG. 1. Please refer to FIG. 1 and FIG. 7, the first sleeve 180 comprises a first extended wall 181 extending toward the third side wall 162 of the first movable face plate 160 and a first sleeve plate 182 used for assembling the second movable face plate 170. Since the first sleeve 180 has a similar structure to the second sleeve 190, the second sleeve 190 comprises a second extended wall 191 extending toward the fourth side wall 163 or the first movable face plate 160 and a second sleeve plate 192 used for assembling the second movable face plate 170 (as shown in FIG. 1).

Figure 8:
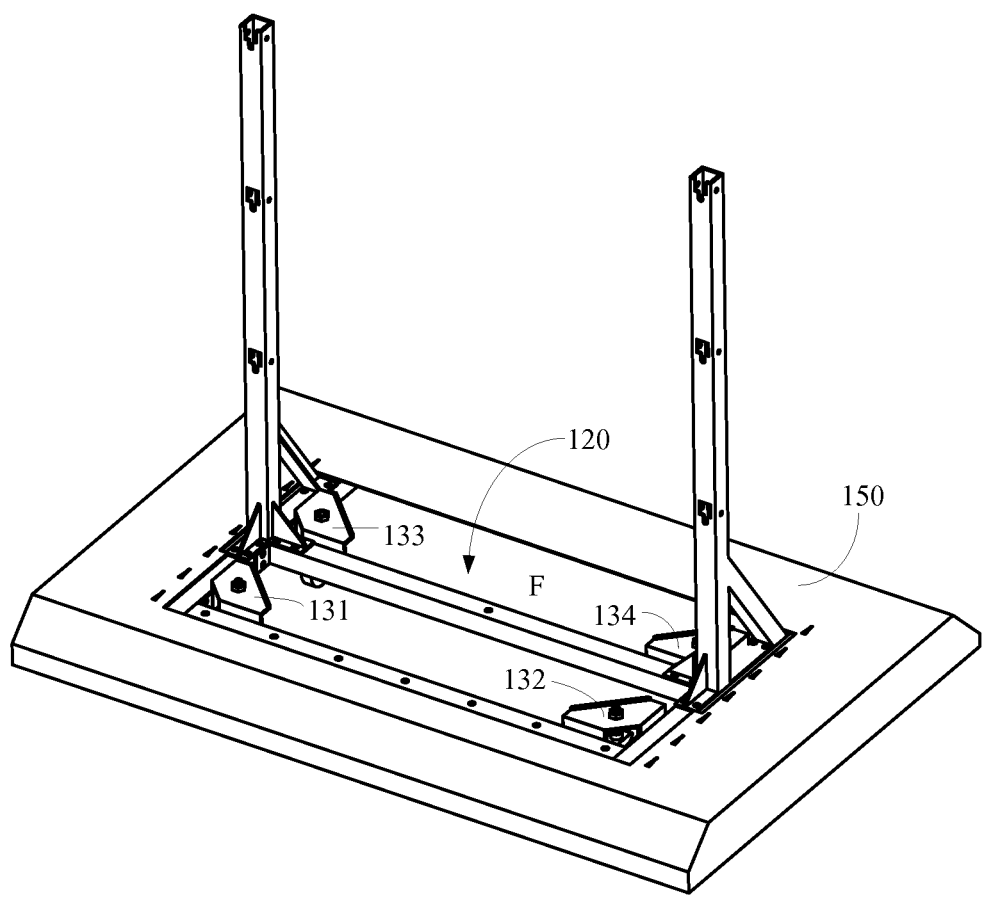
FIG. 8 is a schematic diagram of the cooperation of the bed plate of FIG. 1 and the chassis of FIG. 3.
Figure 11:
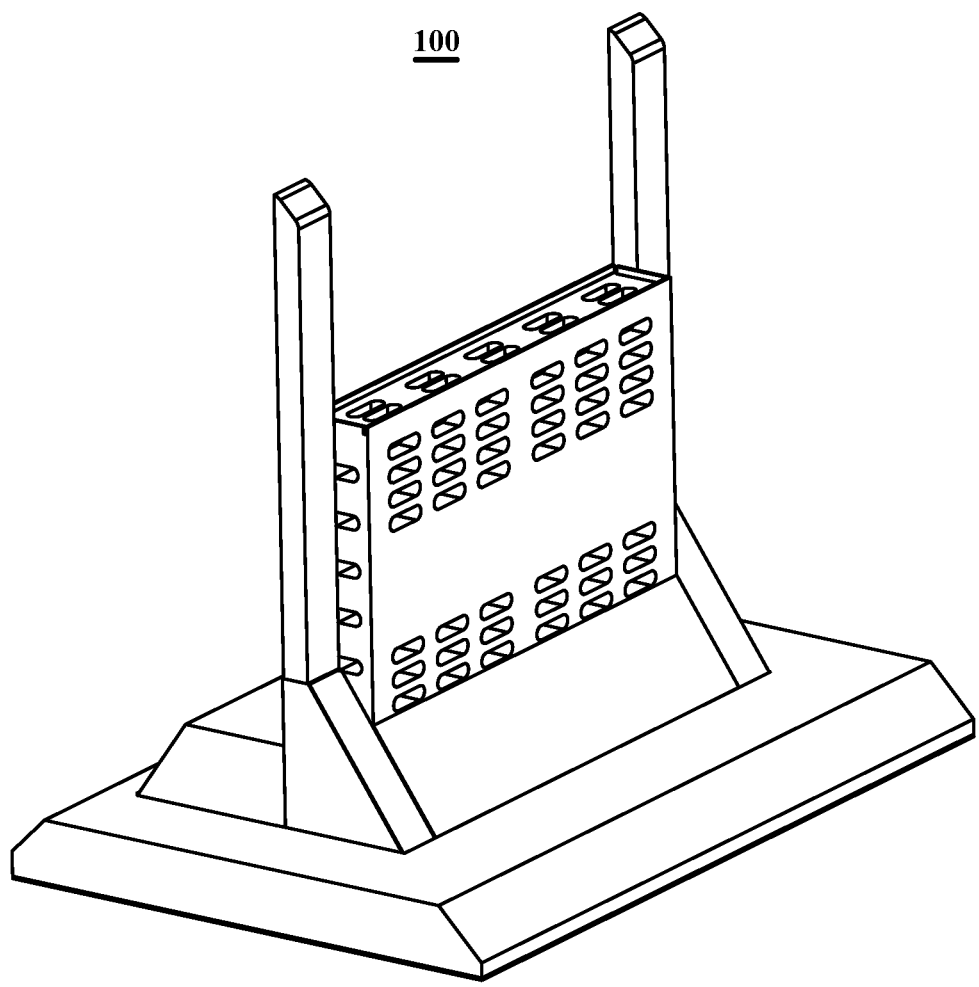
FIG. 11 is a schematic diagram showing an integral structure of the supporting device of FIG. 1 after assembly.

FIG. 11 is a schematic diagram showing an integral structure of the supporting device 100 of FIG. 1 after assembly. The following is the detailed description of the assembly of the supporting device 100 with various components of FIG. 1:

The main beam 110 is first fixed on the chassis 120 as shown in FIG. 3. The chassis 120 is then covered by the bed plate 150. At this time, the first caster mount bracket 131, the second caster mount bracket 132, the third caster mount bracket 133, and the fourth caster mount bracket 134 are all located in an opening area F of the bed plate 150, as shown in FIG. 8.

After that, the first sleeve 180 is slid over the first triangular structure D. The second sleeve 190 is slid over the second triangular structure E.

Figure 9:
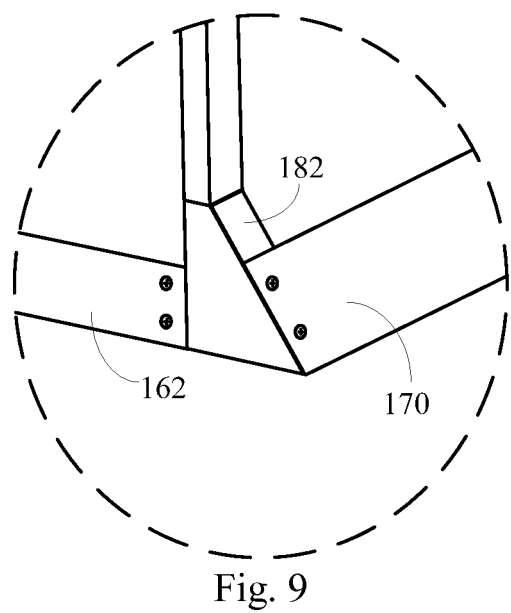
FIG. 9 is a schematic diagram of the cooperation of the first movable face plate and the second movable face plate and the first sleeve according to the present invention.

The hook 165 of the first movable face plate 160 is thereafter hooked to the recess 153 of the bed plate 150 correspondingly. The first movable face plate 160 is thus on top of the first caster mount bracket 131 and the second caster mount bracket 132 to cover the opening area F corresponding to the first caster mount bracket 131 and the second caster mount bracket 132. After that, as shown in FIG. 9, the first extended wall 181 of the first sleeve 180 and the second extended wall 191 of the second sleeve 190 are respectively fixed to the third side wall 162 and the fourth side wall 163 of the first movable face plate 160 by screw tightening. As a result, the first movable face plate 160, the first sleeve 180, and the second sleeve 190 are axed together.

Two ends of the second movable face plate 170 are then fixed to the first sleeve plate 182 of the first sleeve 180 and the second sleeve plate 192 of the second sleeve 190, respectively, by screw tightening as shown in FIG. 9. At this time, the second movable face plate 170 is on top of the third caster mount bracket 133 and the fourth caster mount bracket 134 to cover the opening area F corresponding to the third caster mount bracket 133 and the fourth caster mount bracket 134.

Figure 10:
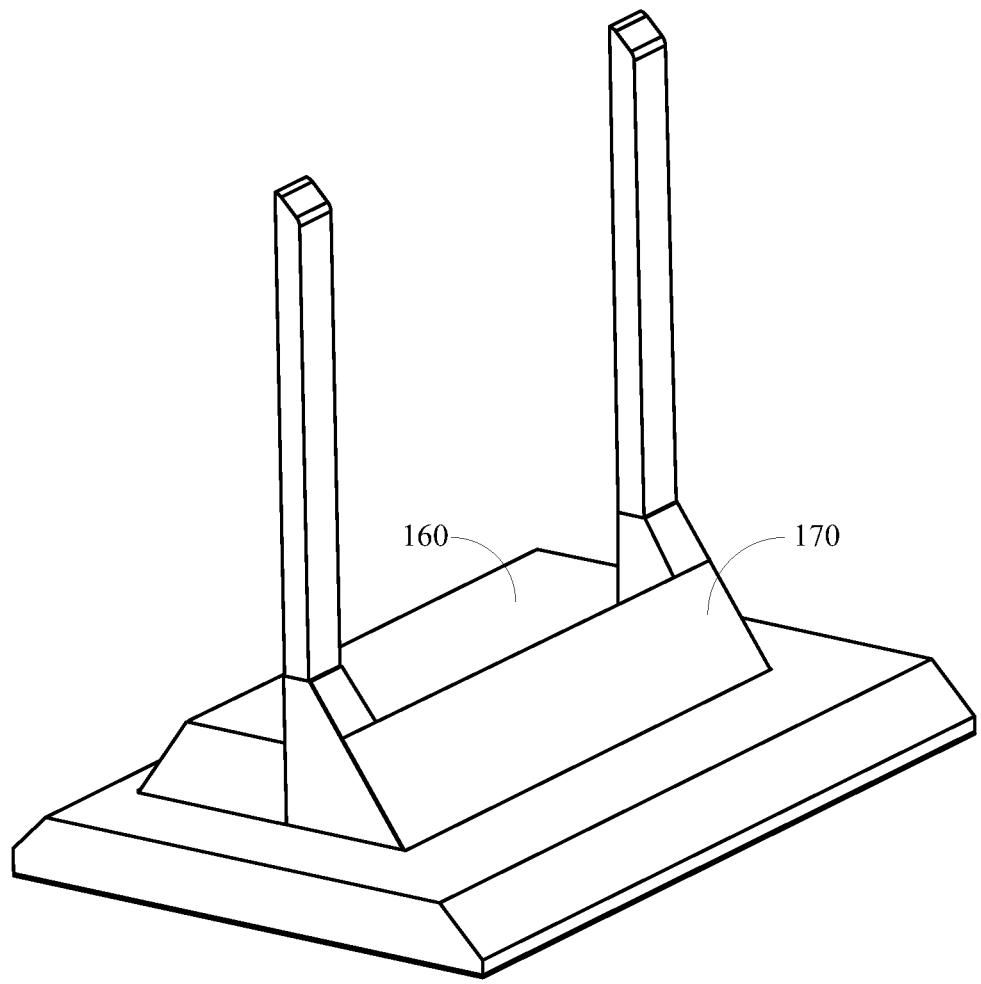
FIG. 10 is a schematic diagram showing a structure of the first movable face plate and the second movable face plate after assembly according to the present invention.

As shown in FIG. 10, with the cooperation of the first movable face plate 160 and the second movable face plate 170, the opening area F of FIG. 8 is covered.

The support member 200 is thereafter disposed between the first support 111 and the second support 112 and is fixed above the caster mount bracket 130. After that, the storage box 300 is disposed on the support member 200 to finish the assembly of the supporting device 100, as shown in FIG. 11.

Figure 12:
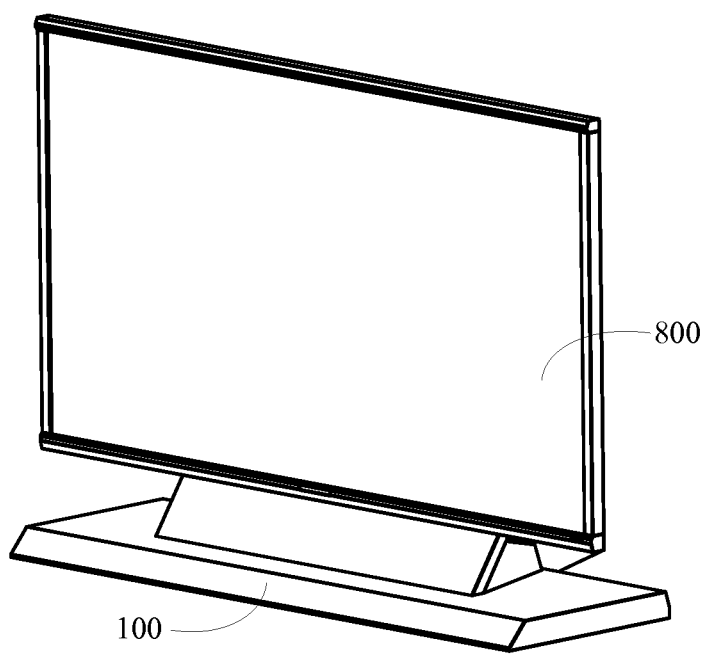
FIG. 12 is a schematic diagram showing the assembly of the supporting device of FIG. 11 and the display apparatus.

When the supporting device 100 of FIG. 11 is used for hanging a display apparatus 800, a first support plate 400 and a second support plate 500 are further disposed (as shown in FIG. 1) to respectively cover the first support 111 and the second support 112 of the quadrate pipe structure according to the present embodiment, so that the integration design is given a more aesthetically pleasing look. The display apparatus 800 is fixed to the supporting device 100 by inserting the locking members 700 through the first support plate 400 and the second support plate 500, as shown in FIG. 12.

In other embodiments of the present invention, those skilled in the art is able to make exchanges or other variations of various components and the positions of various components in the supporting device without any creative work. The present invention is not limited to the embodiments shown in FIG. 1 to FIG. 12.

In summary, in the present invention design the main beam for hanging the display apparatus is fixed on the chassis. In addition, at least two threaded stem casters are disposed in the chassis, and the chassis is covered by the bed plate. The clearance between the chassis and the ground is thus sheltered by the four side walls of the bed plate. The display apparatus is allowed to be moved by wrenching the threaded stem casters in the opening area of the bed plate to turn down them until reaching the ground. After the display apparatus is moved to the specified location, the wrenching operation is performed in the opening area so that the chassis rather than the threaded stem casters contacts with the ground to finish the movement of the display apparatus. The present invention supporting device allows the wrenching operation of the casters to be performed in the opening area. Hence, the wrenching operation is facilitated. Not only can the display apparatus be moved conveniently and efficiently, but also the clearance between the chassis and the ground is sheltered to give the integration design a more aesthetically pleasing look.

While the present invention has been described in connection with what is considered the most practical and preferred embodiments, it is understood that this invention is not limited, to the disclosed embodiments but is intended to cover various arrangements made without departing from the scope of the broadest interpretation of the appended claims.

What is claimed is:

1. A supporting device for a display apparatus, comprising:
a chassis formed by joining a first unit and a second unit, the first unit and the second unit being both quadrate pipes, the chassis comprising at least two caster mount brackets, the caster mount brackets being fixed at joints of the first unit and the second unit;
a plurality of threaded stem casters disposed in the chassis and being mounted to the caster mount brackets correspondingly so that the supporting device is allowed to be moved;
a bed plate covering the chassis, the bed plate comprising a first top wall and a first side wall surrounding the first top wall, a height of the first side wall being greater than a height of the chassis, the first top wall covering and being on top of the chassis, the first top wall comprising an opening area, and the plurality of casters and the caster mount brackets being located in the opening area;

a first movable face plate and a second movable face plate disposed on top of the opening area; and
one or more main beams being fixed to the chassis for hanging the display apparatus, the one or more main beams comprising quadrate pipes, and a plurality of positioning structures at different heights being disposed in the one or more main beams.

2. The supporting device as claimed in claim 1, wherein each of the positioning structures in the one or more main beams comprises a mounting hole and two concentric limiting holes, the mounting hole is disposed on a first side of the quadrate pipe of the one or more main beams for accommodating a locking member, the locking member is used for hanging the display apparatus on the first side of the quadrate pipe of the one or more main beams, the two concentric limiting holes are respectively disposed on a second side and a third side intersecting with the first side of the quadrate pipe for limiting an upward exercise of the locking member along the height direction of the quadrate pipe.

3. The supporting device as claimed in claim 1, wherein the first unit of the chassis comprises a first connecting piece and a second connecting piece spaced apart from the first connecting piece, the second unit is used for connecting the first connecting piece and the second connecting piece, and the second unit comprises a third connecting piece and a fourth connecting piece.

4. The supporting device as claimed in claim 1, wherein the chassis comprises a first caster mount bracket, a second caster mount bracket, a third caster mount bracket, and a fourth caster mount bracket, the first caster mount bracket, the second caster mount bracket, the third caster mount bracket, and the fourth caster mount bracket are located in the opening area of the bed plate; and
the supporting device comprises four threaded stem casters, the four threaded stem casters are mounted to the first caster mount bracket, the second caster mount bracket, the third caster mount bracket, and the fourth caster mount bracket correspondingly, and a clearance between the first caster mount bracket, the second caster mount bracket, the third caster mount bracket, and the fourth caster mount bracket and the ground is greater than a diameter of the four threaded stem casters.

5. The supporting device as claimed in claim 1, further comprising a support member and a storage box between a first support and a second support, the support member being disposed above the caster mount brackets, and the storage box being disposed on the support member.

6. A supporting device for a display apparatus, comprising:
a chassis;
a plurality of threaded stem casters disposed in the chassis so that the supporting device is allowed to be moved;
a bed plate covering the chassis, the bed plate comprising a first top wall and a first side wall surrounding the first top wall, a height of the first side wall being greater than a height of the chassis, the first top wall covering and being on top of the chassis, the first top wall comprising an opening area, and the plurality of casters being located in the opening area; and
one or more a main beams being fixed to the chassis for hanging the display apparatus,
wherein the one or more main beams comprises quadrate pipes, a plurality of positioning structures at different heights are disposed in the one or more main beams each of the positioning structures comprises a mounting hole and two concentric limiting holes, the mounting hole is disposed on a first side of the quadrate pipe for accommodating a locking member, the locking member is used for hanging the display apparatus on the first side of the quadrate pipe the two concentric limiting holes are respectively disposed on a second side and a third side intersecting with the first side of the quadrate pipe for limiting an upward exercise of the locking member along the height direction of the quadrate pipe.

7. The supporting device as claimed in claim 6, wherein the one or more main beams comprises a first support and a second support parallel with and spaced apart from the first support, the plurality of positioning structures are disposed in the first support and the second support, the positioning structures in the first support are corresponding to the positioning structures in the second support, the mounting hole comprises a square hole and a concave hole connecting with the square hole, and the limiting holes are disposed at a connecting region between the square hole and the concave hole along a direction of the one or more main beams.

8. The supporting device as claimed in claim 7, wherein the chassis is formed by joining the first unit and the second unit, the first unit and the second unit are both quadrate pipes, the first unit comprises a first connecting piece and a second connecting piece spaced apart from the first connecting piece, the second unit is used for connecting the first connecting piece and the second connecting piece, the second unit comprises a third connecting piece and a fourth connecting piece, the first support is fixed to the first connecting piece, and the second support is fixed to the second connecting piece.

9. The supporting device as claimed in claim 8, further comprising auxiliary supports, a first sleeve, and a second sleeve, the auxiliary supports comprising a first auxiliary support and a second auxiliary support, the first auxiliary support being a quadrate pipe and each of two ends of the first auxiliary support being respectively connected to the first support and the first connecting piece to form a first triangular structure, the second auxiliary support being a quadrate pipe and each of two ends of the second auxiliary support being respectively connected to the second support and the second connecting piece to form a second triangular structure, the first sleeve being slid over the first triangular structure, and the second sleeve being slid over the second triangular structure.

10. The supporting device as claimed in claim 8, wherein the chassis further comprises at least two caster mount brackets, the caster mount brackets are located in the opening area of the bed plate and fixed at joints of the first unit and the second unit, the casters are mounted to the caster mount brackets correspondingly, and a clearance between the caster mount brackets and the ground is greater than a diameter of the casters.

11. The supporting device as claimed in claim 10, wherein the chassis comprises a first caster mount bracket, a second caster mount bracket, a third caster mount bracket, and a fourth caster mount bracket, the first caster mount bracket, the second caster mount bracket, the third caster mount bracket, and the fourth caster mount bracket are located in the opening area of the bed plate, each of two ends of the first caster mount bracket is respectively fixed to the first connecting piece and the third connecting piece, each of two ends of the second caster mount bracket is respectively fixed to the second connecting piece and the third connecting piece, each of two ends of the third caster mount bracket is respectively fixed to the first connecting piece and the fourth connecting piece, each of two ends of the fourth caster mount bracket is respectively fixed to the second connecting piece and the fourth connecting piece.

12. The supporting device as claimed in claim 11, further comprising a first movable face plate and a second movable face plate disposed on the bed plate, the first movable face plate being on top of the first caster mount bracket and the second caster mount bracket, and the second movable face plate being on top of the third caster mount bracket and the fourth caster mount bracket.

13. The supporting device as claimed in claim 12, wherein the first movable face plate comprises a second top wall and a third side wall, a fourth side wall, and a fifth side wall surrounding the second top wall, the fifth side wall is disposed between the third side wall and the fourth side wall, at least one hook is respectively disposed on the bottom of the third side wall, the fourth side wall, or the fifth side wall, at least one recess corresponding to the hook is disposed on the bed plate, the hook is hooked to the recess correspondingly to fix the first movable face plate to the bed plate, the first sleeve and the second sleeve comprise a first extended wall and a second extended wall extending toward the first movable face plate respectively, the first extended wall and the second extended wall are respectively fixed to the third side wall and the fourth side wall by screw tightening, the second movable face plate is a planar structure and is fixed to the first sleeve and the second sleeve by screw tightening.

14. The supporting device as claimed in claim 10, further comprising a support member and a storage box between the first support and the second support, the support member being disposed above the caster mount brackets, and the storage box being disposed on the support member.

* * * * *